Figure 1:
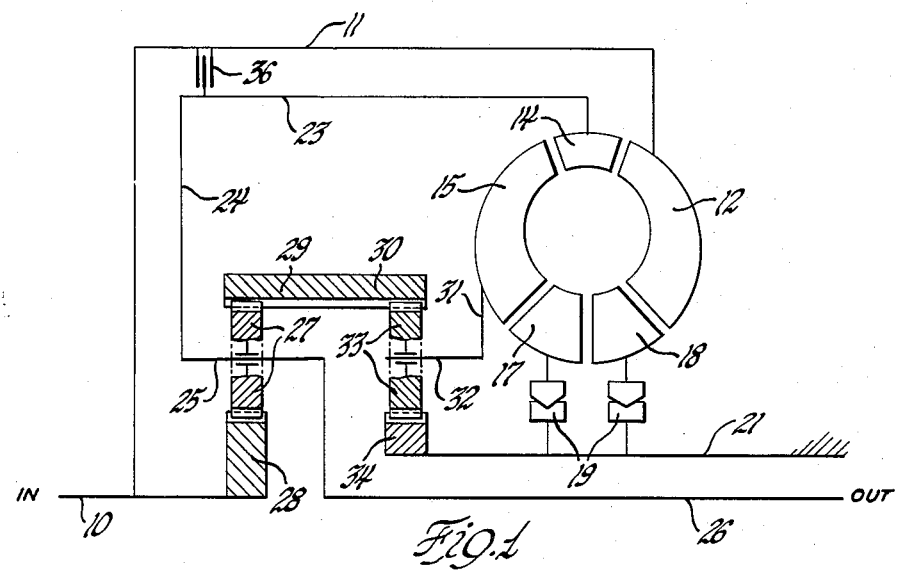

INVENTORS
Kenneth B. Harmon
& Robert M. Tuck
BY A. M. Heiter
ATTORNEY

United States Patent Office
2,969,694
Patented Jan. 31, 1961

2,969,694

TRANSMISSION

Kenneth B. Harmon and Robert M. Tuck, Indianapolis, Ind., assignors to General Motors Corporation, Detroit, Mich., a corporation of Delaware Filed June 10, 1959, Ser. No. 819,346

25 Claims. (Cl. 74—677)

This invention relates to torque converter transmissions and more particularly to a twin turbine split-torque torque converter transmission.

This transmission employs a torque converter unit having a pump, a first and a second turbine, and a stator. The first and second turbines are designed so that the first turbine provides maximum positive torque at converter stall and decreasing torque output with increasing speed ratio between the output and input shafts, while the second turbine produces a small negative torque at converter stall, a decreasing negative torque with increasing speed ratio during a small initial high torque ratio operating range and an increasing positive torque with increasing speed ratio throughout the normal medium and low torque ratio operating range. Gearing is employed to connect the input shaft and the first and second turbines to the output shaft so that the proportion of direct mechanical power transmitted from the input shaft to the output shaft increases with increasing speed ratio, due to the increased torque output of the second turbine. The gearing also causes the speed of the first turbine and the speed of the second turbine to be substantially more nearly equal than similar dual turbine converters and to maintain a substantially constant speed differential. This gearing reduces the speed of the second turbine as compared to the speed of the first turbine and the pump. The speed of the first turbine will increase to a slightly greater degree with respect to the speed of the second turbine only when the first stator free-wheels and the torque converter approaches the coupling stage.

In one modification two planetary gear sets are employed to connect the converter unit to function in this manner. The input is connected to the sun gear of the split torque or first planetary gear unit and the pump. The first turbine is connected to the carrier of the first gear unit and the output shaft. The ring gears of the two planetary gear units are interconnected. The carrier of the overdrive or second planetary gear unit is connected to the second turbine and the sun gear is grounded. This arrangement permits a substantially constant differential between the speed of the second turbine and the speed of the first turbine with increasing speed ratio. The second planetary gear unit provides an overdrive connection from the second turbine to the ring gear of the first gear unit providing a reduced speed for the second turbine.

In another modification the input shaft is connected to the sun gear and the second turbine is connected to the ring gear of the first planetary gear unit. The carrier is connected through a spur step-up gear to the output shaft. The first turbine is connected through a spur reduction gear set to the output shaft and turns faster than the output shaft. The carrier is thus connected to rotate slower than the output shaft speed while the first turbine rotates faster than the output shaft. Preferably the ratio between the first turbine and the carrier is the same as the ratio between the second turbine and the input, when the output is stationary or at converter stall, so that the first and second turbines are rotated at the same speed. However, with increasing speed ratio the first turbine will rotate increasingly faster than the second turbine. The first turbine initially provides high torque which decreases with increasing speed ratio and is connected by a reduction spur gear set to the output. The second turbine initially provides a negative torque at stall which decreases and becomes increasingly positive with increasing speed ratio and is connected by the split torque planetary drive to provide a drive to an intermediate shaft in which the proportion of direct mechanical drive as compared to fluid drive increases with increasing speed ratio. The intermediate shaft is connected by the step-up spur gear to the output.

An object of the invention is to provide in a twin turbine split-torque torque converter transmission having two turbines, a planetary gear set having a sun gear driven by the input, a first drive connection from the second turbine to the ring gear, a second drive connection from the first turbine to the output, one of the first and second drive connections having ratio gearing to change the speed of the drive to cause the first turbine to rotate faster than the second turbine.

Another object of the invention is to provide in a twin turbine split-torque torque converter having gearing connecting the input, first turbine and the second turbine to the output shaft providing increasing mechanical drive with increasing input to output speed ratio and to permit said first turbine to rotate at the same or at a greater speed proportional to the speed of said second turbine with increasing speed ratio.

Another object of the invention is to provide a split torque twin turbine torque converter transmission in which a first planetary gear set has a sun gear connected to the input shaft and a carrier connected to the output shaft and a first turbine and a second planetary gear unit in which the sun gear is grounded; the carrier is connected to the second turbine and the ring gear is connected to the ring gear of the first planetary gear.

Another object of the invention is to provide in a split torque twin turbine torque converter, a converter unit having an input driven pump, a first turbine connected by reduction gearing to the output shaft, a second turbine connected to the ring gear of a planetary gear unit having the sun gear connected to the input and a carrier connected by overdrive gearing to the output shaft.

These and other objects of the invention will be more apparent from the following specification and drawings showing the preferred embodiments of the invention.

Fig. 1 diagrammatically illustrates a split torque twin turbine torque converter transmission employing two planetary gear sets.

Figure 2:
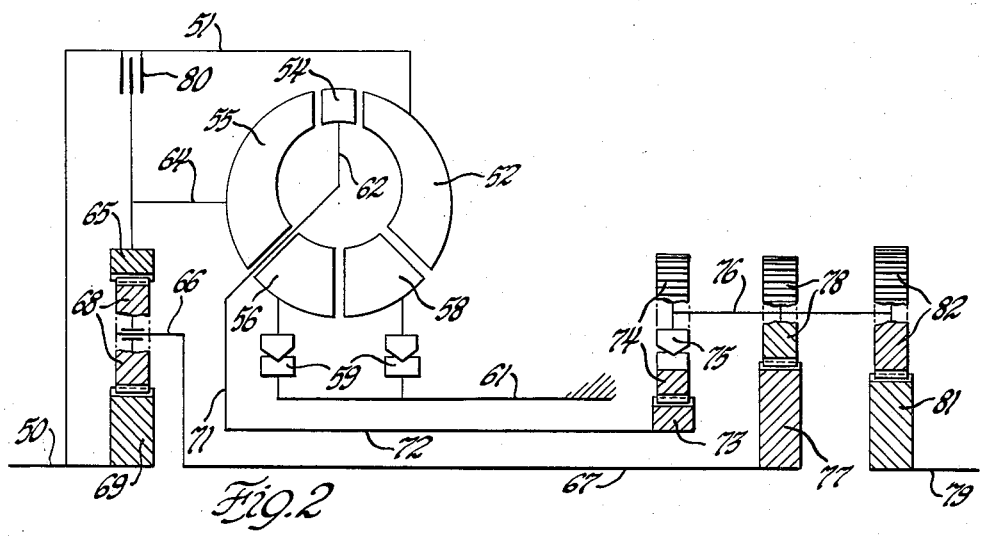

Fig. 2 diagrammatically illustrates a split torque twin turbine torque converter employing a planetary gear set and a spur gear set.

Figure 3:
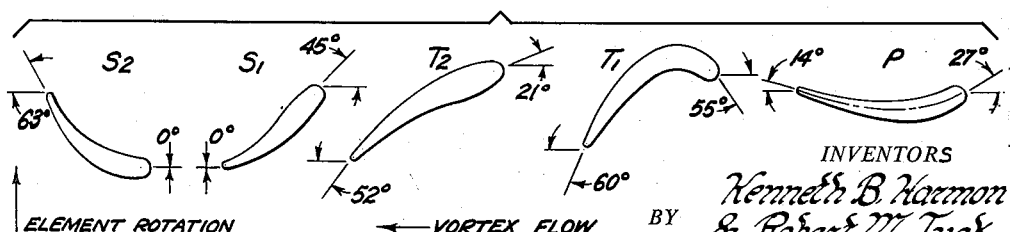

Fig. 3 diagrammatically shows the shape and angles of the blades.

Figure 4:
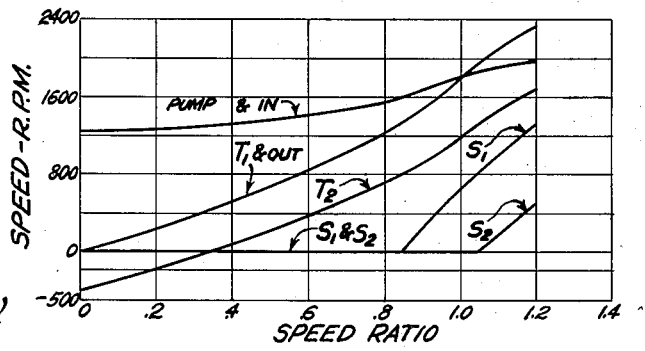

Fig. 4, converter element speed curves for the converter shown in Fig. 1.

Figure 5:
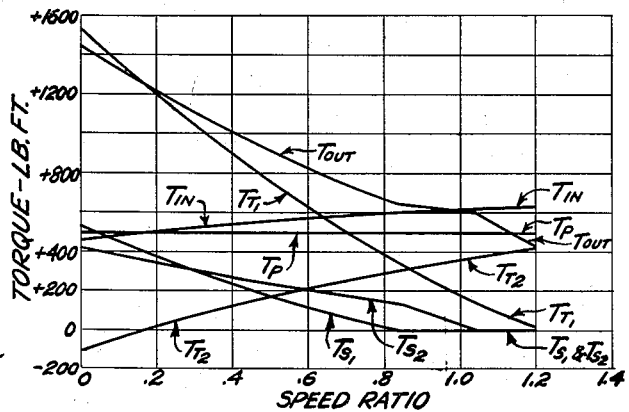

Fig. 5, converter element torque curves for the converter shown in Fig. 1.

Figure 6:
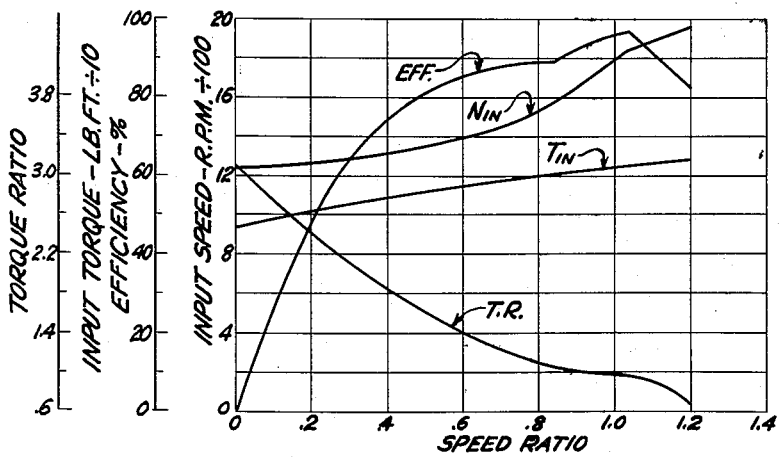

Fig. 6, converter performance curves for the converter shown in Fig. 1.

The split torque twin turbine torque converter illustrated in Fig. 1 has an input shaft 10 drivingly connected to the torque converter housing 11 which drives the torque coverter pump 12. The pump 12 circulates the fluid in the torque converter housing in the torus flow path, first through the first turbine 14, second through the second turbine 16 and then through the first and second stators 17 and 18. The stators are each connected by one-way brakes 19 to the ground sleeve 21 to prevent reverse rotation of the stators. The ground sleeve 21 is fixed to the stationary transmission housing in a conventional manner. The blading of the first and second turbines is such that at converter stall the first turbine 14 provides maximum torque and with increasing speed ratio provides diminishing torque as shown by curve $T_1$, Fig. 4. The second turbine 15 at converter stall provides a small positive or a small negative torque and with increasing speed ratio provides an increasing amount of positive torque as shown by curve $T_2$, Fig. 4, so that at coupling at 1.050 speed ratio as shown by the curves in Fig. 4 or substantially 1:1 speed ratio the second turbine provides substantially all the torque output.

The first turbine is connected by sleeve shaft portion 23 and a disc 24 to the carrier 25 which is connected to the output shaft 26. The carrier 25 has mounted thereon a plurality of planetary pinions 27 which mesh with a sun gear 28 fixed to the input shaft 10 and a ring gear 29 providing a first or split torque planetary gear set. The second turbine 15 is connected by a disc 31 to the carrier 32 which has a plurality of planetary pinions 33 meshing with the sun gear 34 fixed to the ground sleeve 21 and with the ring gear 30 which may be formed integrally with or connected to ring gear 29. This second or overdrive planetary gear set provides an overdrive ratio between the second turbine and the ring gear of the first planetary gear unit. In a preferred example both gear sets have a 30 tooth sun gear and a 60 tooth ring gear providing a 1.5 to 1 ratio figured by the conventional formula, the sum of the teeth on the sun and ring gears to the number of teeth on the ring gear. These gear ratios may vary individually or together in a range between 1.4 and 2:1.

A direct drive clutch 36 may be employed between the input shaft 10 and the output shaft 26 and may be directly connected between housing 11 and sleeve shaft 23.

The operation of this torque converter transmission may best be explained with reference to the speed curves, Fig. 4, the torque curves, Fig. 5, and the performance curves, Fig. 6, all plotted against speed ratio, the ratio of output to input speed. Normal torque converters of this type where the operating range terminates with a coupling range can only approach a speed ratio of one, but this transmission, due to the overdrive planetary gear unit, has an operating range from zero speed ratio to a speed ratio greater than one. Thus, this torque converter provides both underdrive and overdrive ratios. The overdrive gear set having a 1.5 to 1 gear ratio as explained above provides a ring gear output to carrier input overdrive ratio of 1 to .67. Thus, the operative range of the illustrated example of the converter will approach a speed ratio of 1.33 overdrive. The curves show the most useful range of speed ratios extending to a speed ratio of about 1.2.

The speed curves for a typical torque converter as shown in Fig. 1 operating under normal conditions are illustrative of the relationships between elements of the converters made under the invention. Under moderate load conditions the input and pump speed (pump plus input) curve rises slowly with increasing speed ratio. The first turbine and output curve $T_1$ rises fast with increasing speed ratio. The second turbine speed curve $T_2$ rises faster than the pump speed curve but slower than the first turbine speed curve. It will also be seen that the second turbine rotates rearwardly but at a decreasing rate with increasing speed ratio during about one-third of the speed ratio range of the illustrated converter. Thereafter, the second turbine rotates forwardly at an increasing rate. It will be noted that there is a substantially constant speed differential between the speed of the first and second turbines but that it is preferred that the speed differential gradually increases with increasing speed ratio throughout the range of operation. The first stator free-wheels just before 1 to 1 speed ratio and both stators will freewheel at about 1 to 1.05 speed ratio.

The illustrative torque curves are shown in Fig. 5.

In the operation of this transmission at converter stall the first turbine 14 provides substantially all the torque. As the output shaft speed increases, the output to input speed ratio increases, the second turbine 15 will provide an increasing output torque which is connected by the carrier 32 to overdrive the ring gear 29 faster than the carrier 32. This second planetary gear set provides an overdrive connection between the second turbine and the ring gear 29 so that the first turbine 14 will rotate faster than the second turbine during normal operation of the transmission. The torque curves for the input $T_{IN}$, the pump $T_P$, the first turbine $T_{T1}$, the second turbine $T_{T2}$, the first stator $T_{S1}$, the second stator $T_{S2}$, and the output $T_{OUT}$ are illustrative of the relationships obtained with this transmission. Due to a regenerative effect of the second turbine, the initial output torque is less than first turbine torque, but this torque is substantially returned to the pump torque which in this range is greater than the input torque. In this specific example $T_{IN}$ is less than $T_P$ up to 0.17 speed ratio as shown in the torque curves, Fig. 5, because $T_{T2}$ is negative to 0.17 speed ratio compared to $T_{T1}$ and $T_{IN}$ remains $T_P$ minus ⅓ $T_{T2}$ to this speed ratio. The overdrive gear set provides a ratio of 2 to 3 between the second turbine and ring gear and the split torque gear set provides a ratio of 1 to 2 between the ring gear and the sun gear 28 or input or an overall ratio of 1 to 3 between the second turbine and input sun gear 28 so that only ⅓ the torque of the second turbine is effective in this way. Thus, in this initial phase to 0.17 speed ratio the second turbine is driven backward and provides a very small amount of pumping action. The first turbine torque decreases from the maximum at stall to zero as the converter approaches the terminal speed ratio of 1.33. The second turbine provides an initial negative torque but at less than .2 speed ratio in the preferred example, and before the second turbine rotates forwardly it provides positive torque. The efficiency curve in Fig. 6 shows the high efficiency obtainable with this converter over a wide range of operation.

A preferred form of blade for each of these torque converter elements is shown in Fig. 3. The first turbine blades $T_1$ are reversely curved to provide maximum torque at low speed ratios while the second turbine blades $T_2$ are fairly straight and provide maximum torque at higher speed ratios. The preferred blade angles and a preferred range of blade angles for dual turbine torque converters functioning in accordance with the principles of the invention are shown in the following table.

| | P, degrees | $T_1$, degrees | $T_2$, degrees | $S_1$, degrees | $S_2$, degrees |
|---|---|---|---|---|---|
| Preferred inlet angles | −27 | +55 | −21 | −45 | 0 |
| Preferred outlet angles | +14 | −60 | −52 | 0 | +63 |
| Low limit inlet angles | 0 | +40 | 0 | −70 | −15 |
| High limit inlet angles | −45 | +60 | −60 | −30 | −39 |
| Low limit outlet angles | +45 | −45 | −40 | −0 | +55 |
| High limit outlet angles | −45 | −70 | −70 | −0 | +70 |

In a modified split torque twin turbine torque converter transmission shown in Fig. 2, input shaft 50 is connected by the rotary torque converter housing 51 to a pump 52 of a fluid torque converter. The pump circulates fluid through a torus path in sequence through a first turbine 54, a second turbine 55, a first stator 56, and a second stator 58. The first and second stators 56 and 58 are each connected by a one-way brake 59 to a ground sleeve 61 to prevent reverse rotation of both of the stators and to permit selected forward rotation of either stator. The ground sleeve 61 is fixed to a stationary portion of the transmission housing. The first turbine 54 provides at converter stall maximum torque output with diminishing torque output with increasing output to input speed ratio and approaches zero at 1:1 speed ratio. The second turbine 55 provides at converter stall a small positive or negative torque. As the speed ratio increases the torque if initially negative is reduced and then increased in a positive direction and if initially positive increased in a positive direction to a maximum positive value at substantially 1:1 speed ratio to provide substantially all the torque transmitted. The second turbine 55 is connected by a member 64 to rotate with the ring gear 65. The carrier 66 is fixed to the carrier shaft 67 and has planetary pinions 68 meshing with the ring gear 65 and a sun gear 69 fixed to the input shaft 50. The first turbine 54 is connected by the strut 62 and hub 71 to the intermediate shaft 72. The intermediate shaft 72 has fixed thereon a small spur gear 73 which drives a large spur gear 74 connected by a one-way clutch 75 to the lay shaft 76. The carrier shaft 67 is fixed to large spur gear 77 which drives the small spur gear 78 on the lay shaft 76. The output shaft 79 has fixed thereon an intermediate size spur gear 81 which meshes with another intermediate spur gear 82 on the lay shaft 76. The first turbine and intermediate shaft 72 are connected to the output shaft 79 by a reduction ratio gear unit so that the first turbine runs faster than the output shaft. The carrier shaft 67 is connected to the output shaft for forward drive only of the output shaft by an overdrive ratio gear unit so that the carrier shaft runs slower than the output shaft. A lockup clutch 80 may be located between housing 51 and ring gear 65 to lockup the split torque gear set to provide a direct drive to carrier shaft 67 and an overdrive to the output shaft 79.

At converter stall substantially all the torque is provided by the first turbine 54 which drives the intermediate shaft 72. The shaft 72 being connected by the spur gear sets 73—74 and 81—82 to the output shaft 79, drives the output shaft 79 at reduction or underdrive ratio. The output shaft 79 rotates slower than the first turbine 54 at stall since the second turbine 55 provides little torque. There is no drive through the planetary gear set and the intermediate shaft 67. However, with increasing speed ratio and increasing torque output to the second turbine, this turbine drives the ring gear 65 of the first planetary gear set, and with the input driven sun gear 69 provides a split torque drive of the carrier 66 and shaft 67. The shaft 67 is connected by an overdrive gear ratio consisting of spur gear sets 77—78 and 81—82 to the output shaft 79. This blading and gearing arrangement provides substantially the same type of operation as described above in connection with the curves of Figs. 4, 5 and 6 for the transmission shown in Fig. 1 but confines the operation to a zero to one speed ratio range or 1:1 drive ratio and causes the first and second turbines to operate at the same speed when the ratio relationship of the gearing provides the same ratio between the first turbine 54 and the carrier shaft 67 and the second turbine 55 and the input shaft 50 at converter stall. This may be provided in a preferred example by a split torque planetary gear set having a 60 tooth ring gear 65 and a 30 tooth sun gear 69 and spur gearing in which gears 73 and 75 have 96 and 110 teeth respectively, gears 77 and 78 have 110 and 96 teeth respectively, and gears 81 and 82 both have 100 teeth. Then the gear ratio of the first turbine (or intermediate shaft 72) to carrier shaft 67 is $$\frac{96}{110} \times \frac{96}{110} = \frac{92}{121} = 1.32$$

while the ratio of the second turbine (or ring gear 65) to input shaft 50 (or sun gear 69) is $$\frac{30+60}{60} = 1.33$$

It will be appreciated that in the transmission shown in Fig. 2 that increasing the ratio of the first turbine to the carrier shaft, the planetary gear ratio being the same, would provide a drive ratio less than one to one or underdrive and increasing the ratio would provide a drive ratio greater than one to one or overdrive.

The various modifications of the invention disclosed above may be further modified within the scope of the appended claims.

We claim:
1. In a transmission, an input shaft, an output shaft, a fluid torque converter unit having a pump connected to said input shaft, a first turbine, a second turbine, and a stator, means to prevent reverse rotation of said stator, a planetary gear unit having a ring gear, a sun gear and planetary gears meshing with said ring and sun gears mounted on a planetary carrier, said sun gear being connected to said input shaft, drive means including a first drive connecting said carrier to said output shaft, a second drive connecting said second turbine to said ring gear, and a third drive connecting said first turbine to said output shaft, one of said drives having gear means providing other than one to one drive effective to cause said first turbine to rotate proportionally to said second turbine.

2. In a transmission, an input shaft, an output shaft, a fluid torque converter unit having a pump connected to said input shaft, a first turbine providing maximum torque at stall and a gradually decreasing torque with increasing speed ratio and substantially no torque at the maximum speed ratio, a second turbine providing substantially no torque at stall and a gradually increasing torque with increasing speed ratio and maximum torque at the maximum speed ratio, and a stator, means to prevent reverse rotation of said stator, a planetary gear unit having a ring gear, a sun gear and planetary gears meshing with said ring and sun gears mounted on a planetary carrier, said sun gear being connected to said input shaft, drive means including a first drive connecting said carrier to said output, a second drive connecting said second turbine to said ring gear, and a third drive connecting said first turbine to said output shaft, one of said connecting means having overdrive gear means effective to cause said first turbine to rotate substantially proportionally to said second turbine.

3. In a transmission, an input shaft, an output shaft, a fluid torque converter unit having a pump connected to said input shaft, a first turbine, a second turbine, and a stator, means to prevent reverse rotation of said stator, a planetary gear unit having a ring gear, a sun gear and planetary gears meshing with said ring and sun gears mounted on a planetary carrier, said sun gear being connected to said input shaft, drive means including a first drive connecting said carrier to said output shaft, a second drive connecting said second turbine to said ring gear, and a third drive connecting said first turbine to said output shaft, one of said drives having overdrive gear means effective to cause said first turbine to rotate at a speed proportional to the speed of said second turbine.

4. The invention defined in claim 3 and said one of said drives having overdrive gear means being said second drive.

5. The invention defined in claim 3 and said one of said drives having overdrive gear means being said first drive.

6. The invention defined in claim 3 and said one of said drives having overdrive gear means being said first drive and said third drive including underdrive gear means.

7. In a transmission, an input shaft, an output shaft, a fluid torque converter unit having a pump connected to said input shaft, a first turbine, a second turbine, and a stator, means to prevent reverse rotation of said stator, a planetary gear unit having a ring gear, a sun gear and planetary gears meshing with said ring and sun gears mounted on a planetary carrier, said sun gear being connected to said input shaft, torque transmitting means connecting said first turbine to said output shaft, drive means including first connecting means connecting said carrier to said output shaft and second connecting means connecting said second turbine to said ring gear, one of said connecting means having overdrive gear means.

8. The invention defined in claim 7 and said one of said connecting means being said second connecting means.

9. The invention defined in claim 7 and said one of said connecting means being said first connecting means.

10. The invention defined in claim 7 and said one of said connecting means being said first connecting means, and said torque transmitting means including a reduction gear.

11. In a transmission, an input shaft, an output shaft, a fluid torque converter unit having a pump connected to said input shaft, a first turbine providing maximum torque at stall and a gradually decreasing torque with increasing speed ratio and substantially no torque at the maximum speed ratio, a second turbine providing substantially no torque at stall and a gradually increasing torque with increasing speed ratio and maximum torque at the maximum speed ratio, and a stator, means to prevent reverse rotation of said stator, a planetary gear unit having a ring gear, a sun gear and planetary gears meshing with said ring and sun gears mounted on a planetary carrier, said sun gear being connected to said input shaft, torque transmitting means connecting said first turbine to said output shaft, drive means including first connecting means connecting said carrier to said output shaft and second connecting means connecting said second turbine to said ring gear, one of said connecting means having overdrive gear means.

12. The invention defined in claim 11 and said one of said connecting means being said second connecting means.

13. The invention defined in claim 11 and said one of said connecting means being said first connecting means.

14. The invention defined in claim 11 and said one of said connecting means being said first connecting means, and said torque transmitting means including a reduction gear.

15. In a transmission, an input shaft, an output shaft, a fluid torque converter unit having a pump connected to said input shaft, a first turbine, a second turbine, and a stator, means to prevent reverse rotation of said stator, said pump, first turbine, second turbine and stator being arranged consecutively in a torus path and having blading to provide a first turbine transmitting maximum torque at converter stall and decreasing torque output with increasing output to input shaft speed ratio to substantially zero torque at the maximum speed ratio, and a second turbine providing minimum torque at converter stall and increasing positive torque with increasing speed ratio to a maximum torque at maximum speed ratio, a first and a second planetary gear unit each having a ring gear member, a sun gear member and a carrier member having planetary pinions meshing with said ring gear member and sun gear member, said first turbine being connected to said carrier of said first planetary gear unit and to said output shaft, said gun gear member of said first planetary gear unit being connected to said input shaft and said pump, the sun gear of said second planetary gear unit being held stationary, the ring gears of said first and second planetary gear units being interconnected, and said second turbine being connected to said carrier member of said second planetary gear unit to provide an overdrive between said second turbine and said ring gear member of the said first planetary gear unit.

16. In a transmission, an input shaft, an output shaft, a fluid torque converter unit having a pump connected to said input shaft, a first turbine, a second turbine, and a first and a second planetary gear unit each having a ring gear member, a sun gear member and a carrier member having planetary pinions meshing with said ring gear member and sun gear member, said first turbine being connected to said carrier of said first planetary gear unit and to said output shaft, said gun gear member of said first planetary gear unit being connected to said input shaft and said pump, the sun gear of said second planetary gear unit being held stationary, the ring gears of said first and second planetary gear units being directly interconnected, and said second turbine being connected to said carrier member of said second planetary gear unit to provide an overdrive between said second turbine and said ring gear member of the said first planetary gear unit.

17. In a transmission, an input shaft, an output shaft, a fluid torque converter unit having a pump connected to said input shaft and a first turbine, a second turbine, and a stator, said pump, first turbine, second turbine and stator being arranged respectively sequentially to receive fluid circulated in the torus path by the pump and having blading providing a first turbine producing maximum torque at converter stall and gradually reducing the torque output with increasing output to input shaft speed ratio to substantially zero torque at the maximum speed ratio and said second turbine providing minimum torque at converter stall and a gradually increasing positive torque with increasing speed ratio to a maximum torque at maximum speed ratio, a planetary gear unit having a ring gear member, a sun gear member and a carrier member having planetary pinions meshing with said sun gear and ring gear members, said input shaft being connected to said sun gear member, said second turbine being connected to said ring gear member, a lay shaft, a first spur gear set connecting said lay shaft to said output shaft, a second gear set having an overdrive ratio compared to said first gear set connecting said carrier to said lay shaft to provide an overdrive gear ratio between said carrier and said output shaft, a third gear set having a reduction ratio compared to said first gear set connecting said first turbine to said lay shaft to provide a reduction ratio between said first turbine and said output shaft, and a one-way clutch in said last-mentioned connection to permit said first turbine to run slower.

18. In a transmission, an input shaft, an output shaft, a fluid torque converter unit having a pump connected to said input shaft and a first turbine, a second turbine, and a stator, a planetary gear unit having a ring gear member, a sun gear member and a carrier member having planetary pinions meshing with said sun gear and ring gear members, said input shaft being connected to said sun gear member, said second turbine being connected to said ring gear member, a lay shaft, a first spur gear set connecting said lay shaft to said output shaft, a second gear ratio having an overdrive ratio compared to said first gear set connecting said carrier to said lay shaft to provide an overdrive gear ratio between said carrier and said output shaft, a third gear set having a reduction ratio compared to said first gear set connecting said first turbine to said lay shaft to provide a reduction ratio between said first turbine and said output shaft, and a one-way clutch in said last-mentioned connection to permit said first turbine to run slower.

19. In a transmission, an input shaft, an output shaft, a fluid torque converter unit having a pump connected to said input shaft and a first turbine, a second turbine, and a stator, said pump, first turbine, second turbine, and stator being arranged respectively sequentially to receive fluid circulated in the torus path by the pump and having blading providing a first turbine producing maximum torque at converter stall and gradually reducing the torque output with increasing output to input shaft speed ratio to substantially zero torque at the maximum speed ratio, and said second turbine providing minimum torque at converter stall and a gradually increasing positive torque with increasing speed ratio to a maximum torque at maximum speed ratio, a planetary gear unit having a ring gear member, a sun gear member and a carrier member having planetary pinions meshing with said sun gear and ring gear members, said input shaft being connected to said sun gear member, said second turbine being connected to said ring gear member, gear means connecting said carrier to said output shaft to provide an overdrive gear ratio between said carrier and said output shaft, gear means connecting said first turbine to said output shaft to provide a reduction ratio between said first turbine and said output shaft, and a one-way clutch in said last-mentioned gear means connection to permit said first turbine to run slower.

20. In a transmission, an input shaft, an output shaft, a fluid torque converter unit having a pump connected to said input shaft and a first turbine, a second turbine, and a stator, a planetary gear unit having a ring gear member, a sun gear member and a carrier member having planetary pinions meshing with said sun gear and ring gear members, said input shaft being connected to said sun gear member, said second turbine being connected to said ring gear member, gear means connecting said carrier to said output shaft to provide an overdrive gear ratio between said carrier and said output shaft, and gear means connecting said first turbine to said output shaft to provide a reduction ratio between said first turbine and said output shaft.

21. The invention defined in claim 20 and a one-way clutch in said last-mentioned gear means connection to permit said first turbine to run slower.

22. In a transmission, an input shaft, an output shaft, a fluid torque converter unit having a pump connected to said input shaft, a first turbine providing maximum torque at stall and a gradually decreasing torque with increasing speed ratio and substantially no torque at the maximum speed ratio, a second turbine providing substantially no torque at stall and a gradually increasing torque with increasing speed ratio and maximum torque at the maximum speed ratio, and a stator, means to prevent reverse rotation of said stator, a planetary gear unit having a ring gear, a sun gear and planetary gears meshing with said ring and sun gears mounted on a planetary carrier, said sun gear being connected to said input shaft, drive means including a first drive connecting said carrier to said output, a second drive connecting said second turbine to said ring gear, and a third drive connecting said first turbine to said output shaft, one of said connecting means having gear means providing a ratio other than one to one drive effective to cause said first turbine to rotate substantially proportionally to said second turbine.

23. In a transmission, an input shaft, an output shaft, a fluid torque converter unit having a pump connected to said input shaft, a first turbine, a second turbine, and a stator, means to prevent reverse rotation of said stator, a planetary gear unit having a ring gear, a sun gear and planetary gears meshing with said ring and sun gears mounted on a planetary carrier, said sun gear being connected to said input shaft, drive means including a first drive connecting said carrier to said output shaft, a second drive connecting said second turbine to said ring gear, and a third drive connecting said first turbine to said output shaft, one of said drives having gear means providing a ratio other than one to one drive effective to cause said first turbine to rotate at a speed proportional to the speed of said second turbine.

24. In a transmission, an input element, an output element, a fluid torque converter unit having a pump connected to said input element, a first turbine, a second turbine, and a stator, means to prevent reverse rotation of said stator, a planetary gear unit having a ring gear member, a sun gear member and planetary pinions meshing with said ring gear member and sun gear member mounted on a planetary carrier member, connecting means connecting said input to drive one member, first drive means connecting said first turbine to a second member, second drive means connecting said second turbine to a third member, one of said second and third members being connected to said output element, and one of said first and second drive means having additional gear means providing other than a one to one drive to cause said first turbine to rotate at a speed at a substantially constant proportion to the speed of said second turbine.

25. In a transmission, an input element, an output element, a fluid torque converter unit having a pump connected to said input element, a first turbine, a second turbine, and a stator, means to prevent reverse rotation of said stator, a planetary gear unit having a ring gear member, a sun gear member and planetary pinions meshing with said ring member and sun gear member mounted on a planetary carrier member, connecting means connecting said input to drive one member, first drive means connecting said first turbine to a second member, second drive means connecting said second turbine to a third member, one of said second and third members being connected at one to one ratio to said output element, and one of said first and second drive means having additional gear means providing other than a one to one drive to cause said first turbine to rotate at a speed at a substantially constant proportion to the speed of said second turbine.

References Cited in the file of this patent

UNITED STATES PATENTS

| | | |
|---|---|---|
| 2,737,828 | Seybold | Mar. 13, 1956 |
| 2,820,373 | Dodge | Jan. 21, 1958 |

UNITED STATES PATENT OFFICE
CERTIFICATION OF CORRECTION

Patent No. 2,969,694

January 31, 1961

Kenneth B. Harmon et al.

It is hereby certified that error appears in the above numbered patent requiring correction and that the said Letters Patent should read as corrected below.

Column 7, line 59, and column 8, line 2, for "gun", each occurrence, read -- sun --; column 10, line 34, after "ring" insert -- gear --.

Signed and sealed this 20th day of June 1961.

(SEAL)
Attest:

ERNEST W. SWIDER
Attesting Officer

DAVID L. LADD
Commissioner of Patents